United States Patent [19]

Rosie et al.

[11] 4,229,798
[45] Oct. 21, 1980

[54] LIQUID STORAGE TANK CONTENTS GAUGE

[75] Inventors: Aeneas M. Rosie; Colin J. Macleod, both of Helensburgh, Scotland

[73] Assignee: Alistair Francis McDermott, London, England

[21] Appl. No.: 873,654

[22] Filed: Jan. 30, 1978

[51] Int. Cl.² .............. G01F 17/00; G01F 23/00
[52] U.S. Cl. ................... 364/564; 73/149; 73/290 V; 235/92 DN; 340/621; 364/571
[58] Field of Search ............ 364/564, 509, 571; 340/603, 612, 621; 73/149, 194 R, 194 A, 194 E, 290 R, 290 B, 290 V, 227, 574; 343/5 R, 5 DP, 5 NA; 235/92 DN, 92 FL

[56] References Cited

U.S. PATENT DOCUMENTS

| | | | |
|---|---|---|---|
| 3,075,382 | 1/1963 | Mathias | 73/149 |
| 3,079,596 | 2/1963 | Atkinson | 340/621 |
| 3,100,885 | 8/1963 | Welkowitz et al. | 340/621 |
| 3,237,451 | 3/1966 | Haeff | 73/290 V |
| 3,540,275 | 11/1970 | Post et al. | 73/290 V |
| 3,553,636 | 1/1971 | Baird | 340/621 |
| 3,596,510 | 8/1971 | Paine et al. | 73/149 |
| 3,656,134 | 4/1972 | Brown | 340/621 |
| 3,678,257 | 7/1972 | Lilley et al. | 235/92 FL |
| 3,918,304 | 11/1975 | Abruzzo et al. | 73/194 A |
| 3,987,674 | 10/1976 | Baumoel | 73/194 A |
| 4,019,034 | 4/1977 | Blom et al. | 73/149 |
| 4,072,046 | 2/1978 | Lao | 73/149 |
| 4,078,427 | 3/1978 | Yoshida et al. | 73/194 A |

FOREIGN PATENT DOCUMENTS 732768  4/1966  Canada ........................ 340/621

*Primary Examiner*—Errol A. Krass
*Attorney, Agent, or Firm*—Charles E. Brown

[57] ABSTRACT

A liquid storage tank contents gauge comprises means providing an electrical signal corresponding to the vertical height of the liquid in a tank in the form of an ultrasonic transducer positioned at the base of the tank and emitting a pulse of acoustic energy vertically upwards and which detects the pulse when reflected from the liquid/air interface within the tank and including timing means provided to time the interval between the emission of the pulse and the detection of the reflected pulse, electronic means for deriving the volume of liquid corresponding to the vertical height, and an output means for providing a visual output of this volume.

9 Claims, 5 Drawing Figures

LIQUID STORAGE TANK CONTENTS GAUGE

The present invention relates to a contents gauge for use with a liquid storage tank, for example a petroleum storage tank. More specifically the gauge according to the present invention measures and gives an indication of the volume of liquid present in the tank and can be readily adapted for use with tanks of any shape.

Known designs of gauge can only be used with tanks of one particular shape and size and re-calibration for tanks of other shapes and sizes is difficult.

According to the present invention there is provided a liquid storage tank contents gauge comprising means providing an electrical signal corresponding to the vertical height of the liquid in a tank, electronic means for deriving the volume of liquid corresponding to said vertical height, and an output means for providing a visual output of said volume.

Preferred embodiments of the present invention will now be described with reference to the accompanying drawings in which:

FIGS. 1a and 1b form FIG. 1 which is a partially sectioned side view of the sensing unit of the gauge according to the present invention shown installed in a tank.

Figure 1:
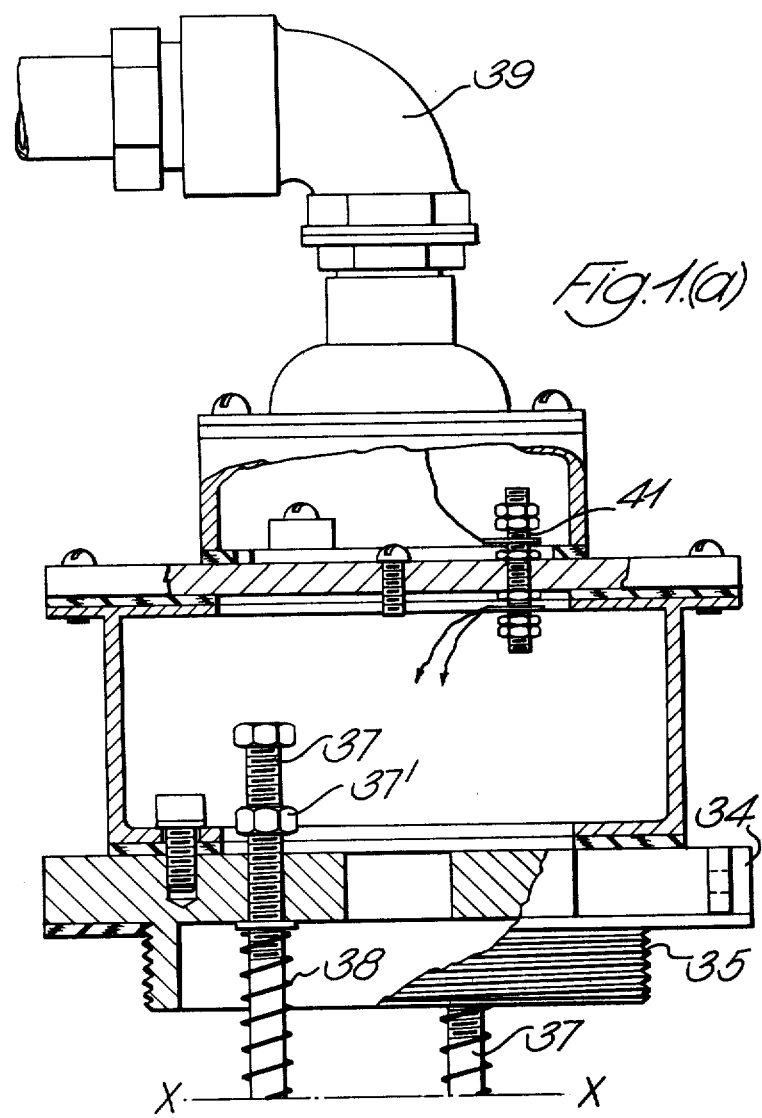
Figure 2:
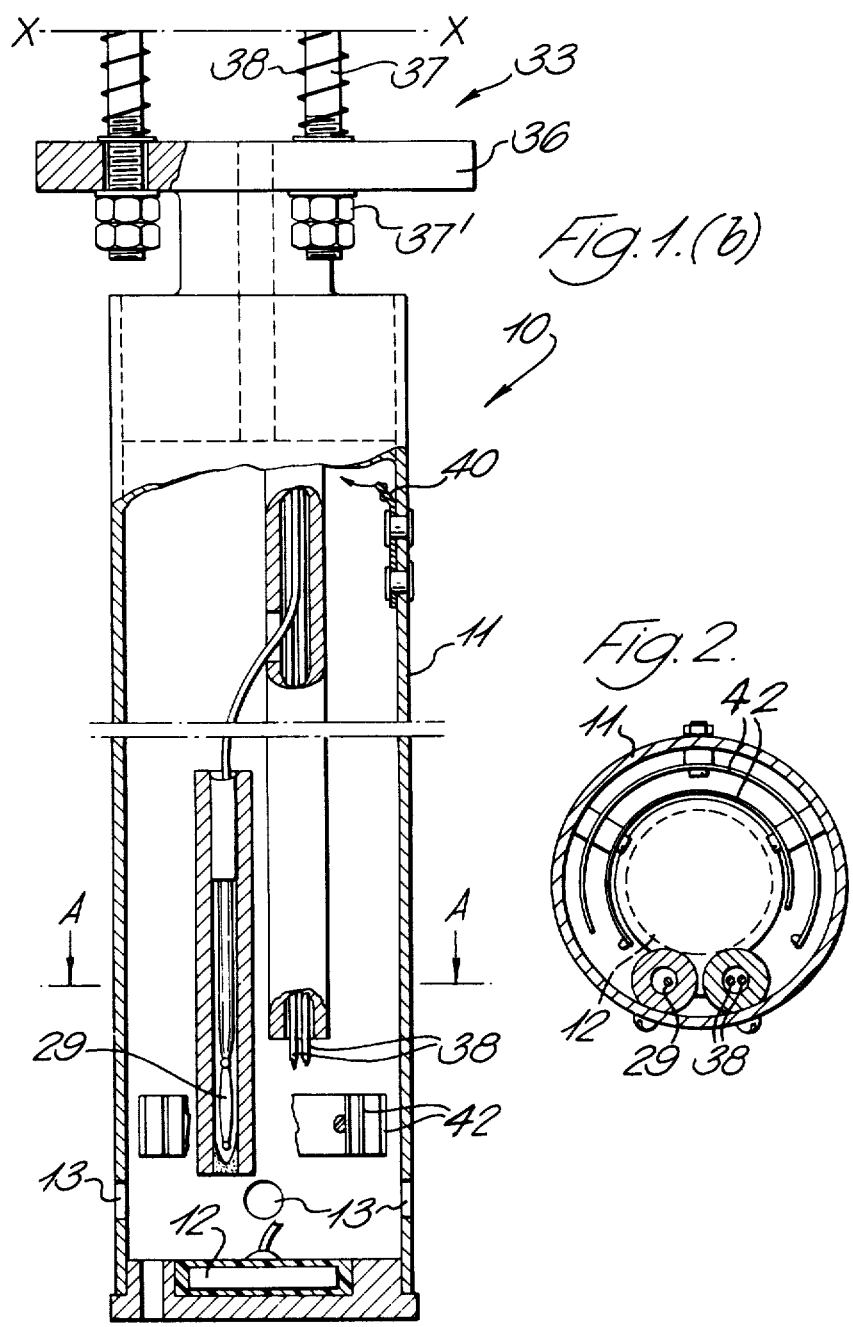
FIG. 2 is a cross section of the gauge taken along the line A—A in FIG. 1b.

The sensing unit 10 shown in FIG. 1 comprises an elongated tube 11, at the lower end of which is mounted an ultrasonic transducer 12. The tube 11 is suspended inside the tank for which the contents are to be gauged and the length of the tube 11 is chosen such that the transducer 12 is positioned at, or close to, the bottom of the tank. The transducer is orientated such that its signal is propagated vertically upwards inside the tube to the surface of the liquid stored in the tank. Holes 13 in the tube 11 allow the liquid to enter the tube 11 and for the liquid level to correspond to the level in the tank.

The type of mounting just described with the transducer inside the tube has the advantage that the transducer is protected from damage during installation or by falling objects. Severe blows could also cause it to produce high voltages due to the piezoelectric effect. However in some situations it is preferable to adopt some other form of mounting such as fixing the transducer to the upper surface of a horizontal plate positioned at the bottom of the tank. It is also possible to mount the transducer outside but in contact with the bottom of the tank. Such a configuration reduces the strength of the echo signal received, requiring extra amplification, but can be a much simpler mechanical arrangement. With large tanks, mounting the transducer and adjusting its orientation from the top by a long rod or similar device may be inconvenient and entry via a hole in the side of the tank near the bottom may be more appropriate.

Figure 3:
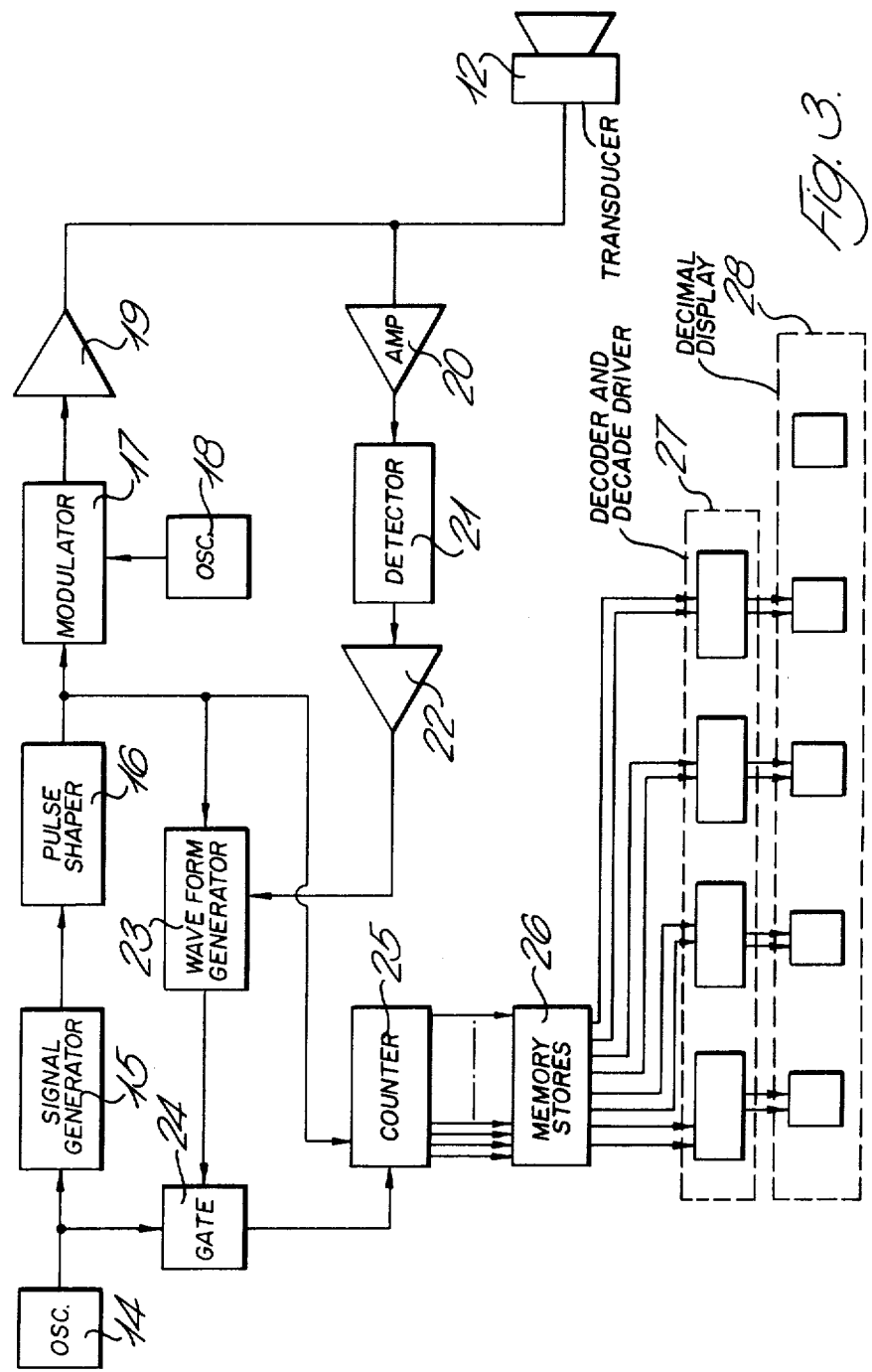
FIG. 3 is a block diagram of an electronic circuit associated with the gauge of the present invention.

As shown in FIG. 3, the signal to the transducer 12 is supplied from an oscillator 14 via a frequency divider 15, a pulse shaper circuit 16 and a modulator 17. A second oscillator 18 controls the modulator 17 such that the signal passed to the transducer 12 is in the form of pulses each composed of a burst several cycles long, at regular intervals. This signal is passed to the transducer via a power amplifier 19.

An example of a transducer used in practice is a lead zirconate titanate disc having a resonant frequency of 500 KHz.

When the ultrasonic signal reaches the liquid surface some of its energy, at least, is reflected by the liquid/air interface and returns to the transducer 12. This reflected signal is converted back into electrical form by the transducer and amplified by amplifier 20. The time taken by the signal to travel to the surface and return to the transducer 12 is equal to twice the depth divided by the velocity of propagation of the ultrasonic waves. This velocity is a constant for any particular liquid and hence the depth can be readily calculated if the time is measured. To measure the time interval between transmission of a burst and reception of its echo, circuitry is arranged to count the number of pulses of a high frequency pulse train of known repetition rate that occur during this interval. This count is referred to as $c_1$. To avoid ambiguity the rate of transmission of signal bursts is sufficiently low to ensure that, even with maximum liquid depth, the echo returns to the transducer before the next signal is transmitted.

The signal from amplifier 20 is passed through a detector circuit 21 and a second amplifier 22. The output of amplifier 22 is fed to a gating waveform generator 23 as a reset signal, the other input to the generator 23 being derived from the output of the pulse shaper circuit 16. The gating generator 23 acts to control a gate 24 which gates the pulses from the oscillator 14 which are operating a counter 25.

In applications where the temperature of the stored liquid is subject to variation, compensation for the change of velocity of propagation of ultrasonic waves with temperature is included. The temperature is measured by a sensor such as a thermistor, a thermocouple or a resistance thermometer 29 and the electrical signal produced controls a voltage controlled oscillator. The number of cycles of the output of this oscillator occurring in the time interval between transmission of a burst and reception of its echo is counted. This count $c_2$ is added to the count $c_1$ referred to above, of the constant frequency. The relationship between temperature and frequency of the voltage controlled oscillator is arranged so that the total count, $c = (c_1 + c_3)$, for a particular depth, does not vary if the ultrasonic velocity changes with temperature.

The total count c occurring in the time interval between transmission of a burst of ultrasonic energy and the reception of its echo is a direct measure of the liquid depth. When the liquid is contained in a tank of non-constant cross sectional area that varies with depth, the relationship between depth and volume is non-linear. This is a common occurrence in many types of storage tank. For example, petrol is frequently kept in cylindrical tanks mounted with their axes in a horizontal plane.

To convert from depth to volume, programmable read only memory (PROM) stores 26 are used. The number of high frequency pulses occurring during the transmitting to echo reception interval is obtained in binary form as an output from counter 25 and is used as the input address to a store. The output of a store for any particular input, is the corresponding volume in binary form. This is converted into binary coded decimal format by decoder and decade driver circuits 27 and used to drive a decimal display 28 indicating the stored volume. To allow alternative readout in either gallons or liters, two sets of programmable read only memories are used and either can be switched into operation.

The vertical diameter of the tank is quantized into more than 1000 equal segments. Thus by making the system sense changes of level at least as small as one of these segments an accuracy of better than 0.1% is obtained. Corresponding to each of the possible liquid heights is a 16 bit word representing the appropriate volume of liquid. Each word has to be 16 bits long because the display has four main decades each requiring a 4 bit BCD (binary coded decimal) input.

An example of suitable PROM units are those manufactured by Signetics (type 825115) and are 4096-bit Bipolar devices organised as 512×8 bytes. Since 1000×16 words are required, four 82S115 units are required per instrument to read gallons. As a gallon/liters option is included another four are incorporated.

A printout facility may also be included that allows the operator to have the liquid volume recorded on a roll of paper. The printing mechanism is supplied with a similar signal to that which actuates the decimal display but only operates when required by the operator.

To indicate when the tank is full a warning alarm is also provided. This is operated by a circuit that detects when the number in the binary counter 25, operating over the time interval between the transmitted signal and the echo return, reaches a predetermined level. The alarm can take the form of a light or an audible sound or both and is principally of use during the operation of filling tanks.

Figure 4:
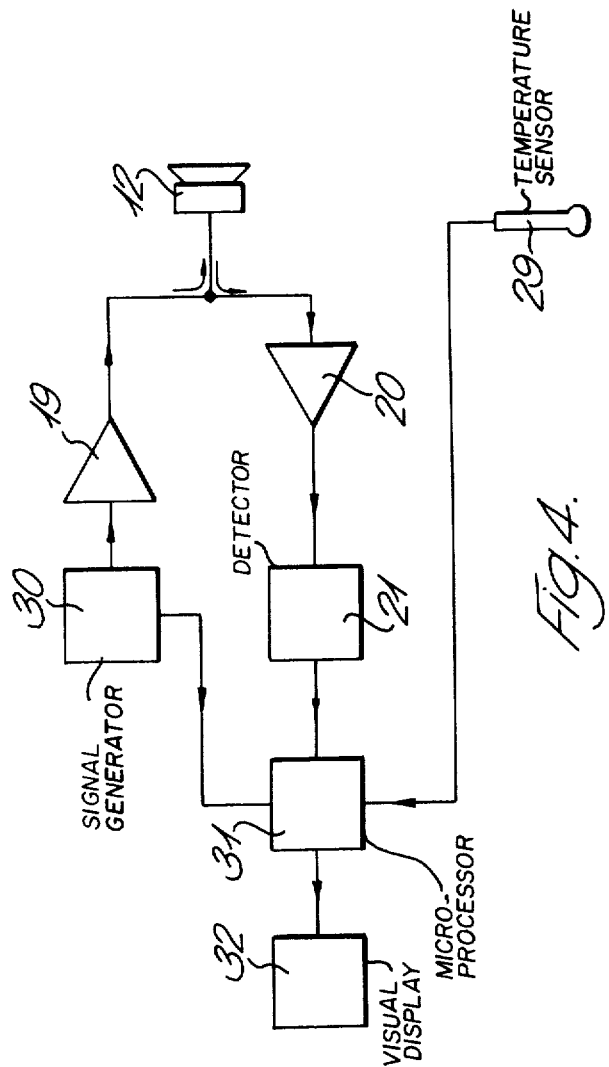
FIG. 4 is a block diagram of an alternative electronic circuit employing a microprocessor.

In some applications the signal processing may be carried out by using a microprocessor instead of dedicated digital circuits, as shown in FIG. 4. With the microprocessor system the compensation for the variation of ultrasonic velocity with temperature may be achieved by multiplying the apparent depth of liquid, as derived from the time interval between the transmitted and echo pulses, by a correction factor. The appropriate factor is selected from the system memory by addressing the latter with the digitised output of the temperature sensor. This method of compensation is used instead of the one described earlier in which a voltage dependent oscillator is controlled by an analogue signal corresponding to temperature.

A variation in the method of converting from depth to volume when a microprocessor is incorporated is also appropriate in some circumstances, instead of storing all the pairs of values of depth/volume quantities in a PROM memory.

As shown in FIG. 4, the signal to the transducer 12 is derived from a signal generator 30 equivalent to the oscillator 14, frequency divider 15, pulse shaper 16 and modulator 17 controlled by oscillator 18, and is amplified by amplifier 19 as before. In addition each pulse from the signal generator 30 is fed to a microprocessor 31 and the return pulse is also fed to the microprocessor 31 via amplifier 20 and detector circuit 21. A signal from the temperature sensor 29 is also fed to the microprocessor 31 and the variation in the propagation velocity with temperature are automatically compensated for.

The microprocessor is programmed to calculate the volume from the tank dimensions and the measured depth. With some tank shapes however, a readily computable relationship between depth and volume cannot be obtained and a combination of the two methods of (a) storing all the depth/volume pairs, and (b) calculating the volume each time is used. The corresponding values of depth and volume for a number of depths between the minimum and maximum are held in store. The values of volume for intermediate depths are obtained by interpolation. Linear interpolation is used when the reference depths are fairly close together or the volume/depth relationship does not depart greatly from linear and higher order interpolation schemes are used in other cases as appropriate. The output from the microprocessor 31 is fed to a visual display 32.

In some situations, especially when tanks are used for petrol storage, water can collect in the bottom of a tank. Because its density is greater than that of petrol and also because of chemical differences inhibiting their mixing, the liquids form two layers with the water below. A warning mechanism is included to indicate when the level of the unwanted water exceeds a certain predetermined threshold.

The water sensing mechanism comprises a pair of concentric annular capacitor plates 42 mounted inside the tube 11 a few inches above the transducer 12. The presence of water is detected by sensing a change in the capacitance between the plates 42, the dielectric constants of fuel, oil or petrol and water being different.

When water is present in the bottom of a tank containing liquid of a lower dielectric constant, it increases the capacitance of the open plate capacitor formed by the plates 42. This capacitance controls the frequency of a squarewave oscillator to an inverse relationship and so the presence of water decreases the frequency. Each cycle of the oscillator output triggers a monostable circuit producing pulses of fixed duration. These are integrated and smoothed to produce a direct voltage. When the value of this voltage drops below a preset threshold value, an alarm is activated. This alarm may take the form of a audible warning, a visible light or both.

The tube 11 is mounted on an assembly 33 which allows the axis of the tube 11 to be aligned truly vertical. The assembly is screwed into the top of the tank by a cap 34 with screw thread 35. To allow adjustment of the assembly 33 permitting the axis of the transducer to be positioned at right angles to the liquid surface the tube 11 is secured to a plate 36.

Plate 36 is suspended from cap 34 by threaded set screws 37. Springs 38 positively hold cap 34 and plate 36 apart. Screws 37 are in tapped holes in cap 34 and turning any one of them alters its vertical position. Adjusting all three screws together raises or lowers plate 36 but altering any one or two of them also varies the angle the axis of transducer assembly 12 makes with the horizontal surface of the liquid. To obtain maximum reflected signal the transducer axis is adjusted to be vertical. Locking nuts 37 are then tightened to maintain this positioning.

The transducer 12 and the capacitor plates 42 are connected to external electrical control equipment by way of coaxial cables 38 which pass up inside the tube 11 to a cable conduit 39 secured to the cap 34. The tube 11 is earthed by way of earth tags 40 which are connected to an earth terminal stud 41 from where an earthing conductor passes to the cable conduit 39.

In an alternative construction, the tube 11 is connected to a trunnion ring at two diameterically opposite points which allows the tube to swing in a vertical plane relative to the trunnion ring. The trunnion ring itself is pivoted in a housing about an axis at right angles to the pivotal axis between the tube and the ring. The housing is secured to the tank by way of an adjustable threaded mount. The trunnion ring acts as a gimbel mounting which allows the tube 11 to hang truly vertical. Such a mounting is especially suitable for situations where the tank may be tilted, as for example in mobile applications.

When the liquid level sensor is to be used in a large capacity, vertical cylindrical bulk storage tank, the sensor unit is preferably mounted on the side of the tank, adjacent its lower end to avoid the use of a tube 11 of an impracticably long length. In this situation some form of pivoting connection is utilized to allow the transducer axis to be aligned truly vertical.

For applications where the tank containing the liquid may be tilted (e.g. in mobile tankers) the beam from an ultrasonic transducer may not arrive perpendicular to the surface. In such situations a capacitive sensor is preferable.

The electrodes of such a capacitor transducer are so arranged that the dielectric space between them is increasingly filled with the liquid to be measured as its level rises. As its dielectric constant is different to that of air the capacitance changes with level. Some electrode configurations used are (a) vertical coaxial cylinders, (b) a double helix of metallic strip or wire, (c) vertical parallel plates (d) interleaved 'fingers' of metal deposited on an insulating material.

To measure liquid depth the output of a high stability, constant frequency oscillator is counted for a time depending on the capacitance sensed. The count is used to read out the corresponding volume as described earlier. In some instruments the depth dependent capacitance is used as the frequency determining element in an oscillator whose output is counted for a fixed time but this is merely an alternative circuit arrangement for producing a count dependent on depth.

What is claimed is:

1. A liquid storage tank contents gauge comprising ultrasonic signal means for providing an electrical signal corresponding to the vertical height of the liquid in a tank, electronic means coupled to said signal means for deriving the volume of liquid corresponding to said vertical height, and an output means coupled to said electronic means for providing a usable output of said volume, said ultrasonic signal means including one and only one transducer for both emitting a signal and receiving the same signal when reflected by a liquid-air interface in a tank, said electronic means comprising a plurality of programmable read-only memory units, each containing the value of a liquid volume corresponding to a given vertical height in said tank and means for searching for and finding the read-only memory unit corresponding to the vertical height provided by said signal, and means for passing the output of said read-only memory unit to said output means.

2. A gauge as claimed in claim 1 wherein said one and only one transducer is an ultrasonic transducer, there are means for mounting said one and only one transducer at the base of a tank to emit a pulse of ultrasonic energy vertically upwards and to detect the same pulse when reflected from a liquid/air interface within a tank, and timing means for timing the interval between the emission of a pluse and the detection of the reflected same pulse by said one and only one transducer.

3. A gauge as claimed in claim 2 wherein said timing means includes a counter which is started at the instant that a pulse is emitted by said one and only one transducer and is stopped at the instant that reflected same pulse is detected by said one and only one transducer.

4. A gauge as claimed in claim 1 wherein said electronic means comprises a microprocessor programmed to compute the volume of liquid corresponding to the said electrical signal.

5. A gauge as claimed in claim 1 wherein said usable output is a visual output.

6. A liquid storage tank contents gauge comprising signal means for providing a first electrical signal corresponding to the vertical height of the liquid in a tank, said signal means including one and only one transducer, electronic means coupled to said one and only one transducer of said signal means for deriving the volume of liquid corresponding to said vertical height, an output means coupled to said electronic means for providing a visual output of said volume, said electronic means including means for producing a second electrical signal indicative of the temperature of the liquid in the tank, and means for modifying said first electrical signal by adding said second electrical signal to said first electrical signal so as to compensate for temperature variations.

7. A liquid storage tank contents gauge comprising signal means for providing an electrical signal corresponding to the vertical height of the liquid in a tank, electronic mans coupled to said signal means for deriving the volume of liquid corresponding to said vertical height, and an output means coupled to said electronic means for providing a visual output of said volume, and means separately mountable in such tank for detecting the presence of a layer of contaminating second liquid immiscible with and of greater density than the liquid to be stored in the tank, said means for detecting the presence of a layer of contaminating second liquid including a pair of capacitor plates, means for mounting said capacitor plates adjacent the base of such tank, and means connected to said capacitor plates for detecting the change in capacitance between said plates indicating the presence of said second liquid.

8. A liquid storage tank contents gauge as claimed in claim 7 wherein said means for detecting the presence of a layer of contaminating second liquid also includes means for providing a warning when the depth of said contaminating liquid exceeds a given value.

9. A liquid storage tank contents gauge comprising signal means including one and only one transducer for providing a first electrical signal corresponding to the vertical height of the liquid in a tank, electronic means coupled to said signal means for deriving the volume of liquid corresponding to said vertical height, an output means coupled to said electronic means for providing a usable output of said volume said gauge having compensating means to compensate for variations in the temperature of the liquid in the tank, said compensating means including means for producing a second electrical signal indicative of the temperature of the liquid in the tank, and means for modifying said first electrical signal by adding said second electrical signal to said first electrical signal.

* * * * *